(12) United States Patent
Spillane et al.

(10) Patent No.: US 12,149,158 B2
(45) Date of Patent: Nov. 19, 2024

(54) POWER SYSTEM HAVING MULTI-TRIGGER ALL-PHASE ACTIVATION

(71) Applicant: SEMICONDUCTOR COMPONENTS INDUSTRIES, LLC, Phoenix, AZ (US)

(72) Inventors: Margaret Spillane, Spillane (IE); Kieran Burke, Quin (IE); Gary Dillon, Kilkishen (IE)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 219 days.

(21) Appl. No.: 18/045,630

(22) Filed: Oct. 11, 2022

(65) Prior Publication Data

US 2024/0120823 A1  Apr. 11, 2024

(51) Int. Cl.
*H02M 1/32* (2007.01)
*H02M 1/00* (2006.01)
*H02M 1/36* (2007.01)

(52) U.S. Cl.
CPC ....... *H02M 1/0032* (2021.05); *H02M 1/0009* (2021.05); *H02M 1/32* (2013.01); *H02M 1/36* (2013.01)

(58) Field of Classification Search
CPC .... H02M 1/0032; H02M 1/0009; H02M 1/32; H02M 1/36
See application file for complete search history.

(56) References Cited

U.S. PATENT DOCUMENTS

| | | | | |
|---|---|---|---|---|
| 8,193,796 B2* | 6/2012 | Tang | ........... | H02M 3/1584 323/283 |
| 2007/0013350 A1* | 1/2007 | Tang | ........... | H02M 3/1584 323/237 |
| 2012/0297104 A1* | 11/2012 | Thottuvelil | ........ | H02J 1/082 710/305 |

OTHER PUBLICATIONS

Su et al. "A Novel Phase-Shedding Control Scheme for Improved light load efficiency of multiphase interleaved DC-DC converters" (IEEE—Oct. 2013).
Datasheet "TPS53681" (TI—Jan. 2019).

* cited by examiner

*Primary Examiner* — Kyle J Moody
(74) *Attorney, Agent, or Firm* — Brake Hughes Bellermann LLP

(57) ABSTRACT

A multi-phase power system configured to add and remove phases according to a plurality of states can increase the efficiency of the power system, which can increase a battery life in mobile applications. After phases are shed, a load may quickly change requiring all phases to be activated before an over current protection triggers a shutdown. The response of the power system to these load transients may be improved through the use of multiple triggers, which can provide an early warning of the changing load requirements more accurately and consistently than a single trigger.

20 Claims, 3 Drawing Sheets

POWER SYSTEM HAVING MULTI-TRIGGER ALL-PHASE ACTIVATION

FIELD OF THE DISCLOSURE

The present disclosure relates to power electronics and more specifically to a power stage having multiple phases that can be activated or deactivated (i.e., shed) based on states of the power converter.

BACKGROUND

A load may be coupled to a rail of a power system for power. The power system may include a plurality of phases coupled, at their outputs, to the rail, and each phase is controlled by a switching signal that is pulse width modulated (PWM) so that the phase can output a regulated voltage to the rail. The current output of the phases can be combined at the rail, and the phases of the power stage may be activated and deactivated based on a current requirement of the load.

SUMMARY

In some aspects, the techniques described herein relate to a power system including: a plurality of phases configured by a plurality of pulse width modulation (PWM) signals to output a total current at a regulated voltage to a load; and a controller configured to output the plurality of PWM signals to the plurality of phases, the controller including: a phase state control module configured determine a level of a monitored current corresponding to the total current and to select an active state from a plurality of states based on the level of the monitored current; a current limit detection circuit configured to assert a current-limit-detection signal while a current signal corresponding to a current feedback loop satisfies a current-transient condition that is based on a number of active phases in the active state of the power system; and a transient detection circuit configured to assert a transient-detection signal while a voltage signal from a voltage feedback loop satisfies a voltage-transient condition, wherein the phase state control module is further configured to change the active state of the power system to an all-phase state while either the current-limit-detection signal or the transient-detection signal is asserted.

In some aspects, the techniques described herein relate to a power system, wherein the phase state control module is further configured to resume selecting the active state based on the level of the monitored current when neither the current-limit-detection signal nor the transient-detection signal is asserted.

In some aspects, the techniques described herein relate to a power system, wherein: the current limit detection circuit includes a threshold that is proportional to the number of active phases in the active state; and the current limit detection circuit is configured to assert the current-limit-detection signal while the current signal from the current feedback loop exceeds the threshold.

In some aspects, the techniques described herein relate to a power system, wherein the current limit detection circuit further includes: a delay so that an over current protection shutdown of the active phases can be triggered if the current-limit-detection signal is asserted for a period longer than the delay.

In some aspects, the techniques described herein relate to a power system, further including: a PWM controller configured to transmit at least one PWM signal to the plurality of phases based on the active state selected by the phase state control module.

In some aspects, the techniques described herein relate to a power system, wherein the plurality of states includes: a one-phase state in which one phase of a plurality of phases is active and is controlled in a discontinuous-conduction mode (DCM) by the at least one PWM signal; a one-phase state in which one of the plurality of phases is active and is controlled in a continuous-conduction mode (CCM) by the at least one PWM signal; a two-phase state in which two phases of the plurality of phases is active and are controlled in a continuous-conduction mode by the at least one PWM signal; and the all-phase state in which all phases of the plurality of phases are active and are controlled in a continuous-condition mode by the at least one PWM signal.

In some aspects, the techniques described herein relate to a power system, wherein the current limit detection circuit includes a current mirror configured to mirror the current signal from the current feedback loop in proportion to a number of active phases in the active state.

In some aspects, the techniques described herein relate to a power system, wherein: each phase of the plurality of phases is a synchronous buck converter.

In some aspects, the techniques described herein relate to a power system, wherein the load is a processor.

In some aspects, the techniques described herein relate to a power system, wherein the current feedback loop has a first response time to a load transient, and the voltage feedback loop has a second response time to the load transient, the first response time different from the second response time.

In some aspects, the techniques described herein relate to a method for controlling a power system, the method including: generating a monitored current corresponding to a total current delivered to a load of the power system; comparing the monitored current to a plurality of thresholds to determine a level of the monitored current; selecting an active state of the power system from a plurality of states based on the level of the monitored current; asserting a current-limit-detection signal while a current signal corresponding to a current feedback loop of the power system satisfies a current-transient condition that is based on a number of active phases in the active state of the power system; asserting a transient detection signal while a voltage signal from a voltage feedback look of the power system satisfies a voltage-transient condition; and changing the active state of the power system to an all-phase state while either the current-limit-detection signal or the transient detection signal is asserted.

In some aspects, the techniques described herein relate to a method for controlling the power system, further including: resuming the selection of the active state based on the level of the monitored current when neither the current-limit-detection signal nor the transient detection signal is asserted.

In some aspects, the techniques described herein relate to a method for controlling the power system, wherein: the current-transient condition includes a threshold that is proportional to the number of active phases in the active state of the power system; and the current-limit-detection signal asserted while the current signal from the current feedback loop exceeds the threshold.

In some aspects, the techniques described herein relate to a method for controlling the power system, further including: triggering an over current protection shutdown of the active phases if the current-limit-detection signal is asserted for a period longer than a delay.

In some aspects, the techniques described herein relate to a method for controlling the power system, further including: transmitting at least one pulse width modulation (PWM) signal to the plurality of phases based on the active state selected.

In some aspects, the techniques described herein relate to a method for controlling the power system, wherein the plurality of states includes: a one-phase state in which one phase of a plurality of phases is active and is controlled in a discontinuous-conduction mode (DCM) by the at least one PWM signal; a one-phase state in which one of the plurality of phases is active and is controlled in a continuous-conduction mode (CCM by the at least one PWM signal; a two-phase state in which two phases of the plurality of phases is active and are controlled in a continuous-conduction mode by the at least one PWM signal; and the all-phase state in which all phases of the plurality of phases are active and are controlled in a continuous-condition mode by the at least one PWM signal.

In some aspects, the techniques described herein relate to a method for controlling the power system, further including: mirroring the current signal from the current feedback loop according to a number of phases active in the active state.

In some aspects, the techniques described herein relate to a controller for a power system, including: a phase state control module configured determine a level of a monitored current corresponding to a total current output to a load and to select an active state from a plurality of states based on the level of a monitored current; a current limit detection circuit configured to assert a current-limit-detection signal while a current signal corresponding to a current feedback loop coupled to the controller satisfies a current-transient condition that is based on a number of active phases in the active state of the power system; and a transient detection circuit configured to assert a transient-detection signal while a voltage signal corresponding to a voltage feedback loop coupled to the controller satisfies a voltage-transient condition, wherein the phase state control module is further configured to change the active state of the power system to an all-phase state while either the current-limit-detection signal or the transient-detection signal is asserted.

In some aspects, the techniques described herein relate to a controller for the power system, wherein the phase state control module is further configured to resume selecting the active state based on the level of the monitored current when neither the current-limit-detection signal nor the transient-detection signal is asserted.

In some aspects, the techniques described herein relate to a controller for the power system, wherein the current limit detection circuit includes a current mirror configured to mirror the current signal from the current feedback loop in proportion to a number of active phases in the active state.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

Deactivating phases (i.e., phase shedding) in a power system when the current requirement drops can help the power stage deliver power to the rail more efficiently. Failure to reactivate the deactivated phases in a timely manner when the current requirement increases, however, can result in damage to the power system (e.g., phase) or a fault condition (i.e., over-current protection (OCP)) that can disrupt operation of the load. The present disclosure describes a power system configured with multiple triggers to activate all phases in response to a transient event. The multiple triggers make the fast activation of all phases less reliant on external feedback circuitry. Further, one of the multiple triggers is adjustable based on an active state of the power system to make the transient detection more accurate. Finally, the disclosed power system can automatically add/shed phases during non-transient periods according to a limited number of states (i.e., 4) to streamline the phase shedding so as to maximize efficiency (i.e., minimize losses) during low-load conditions.

Figure 1:
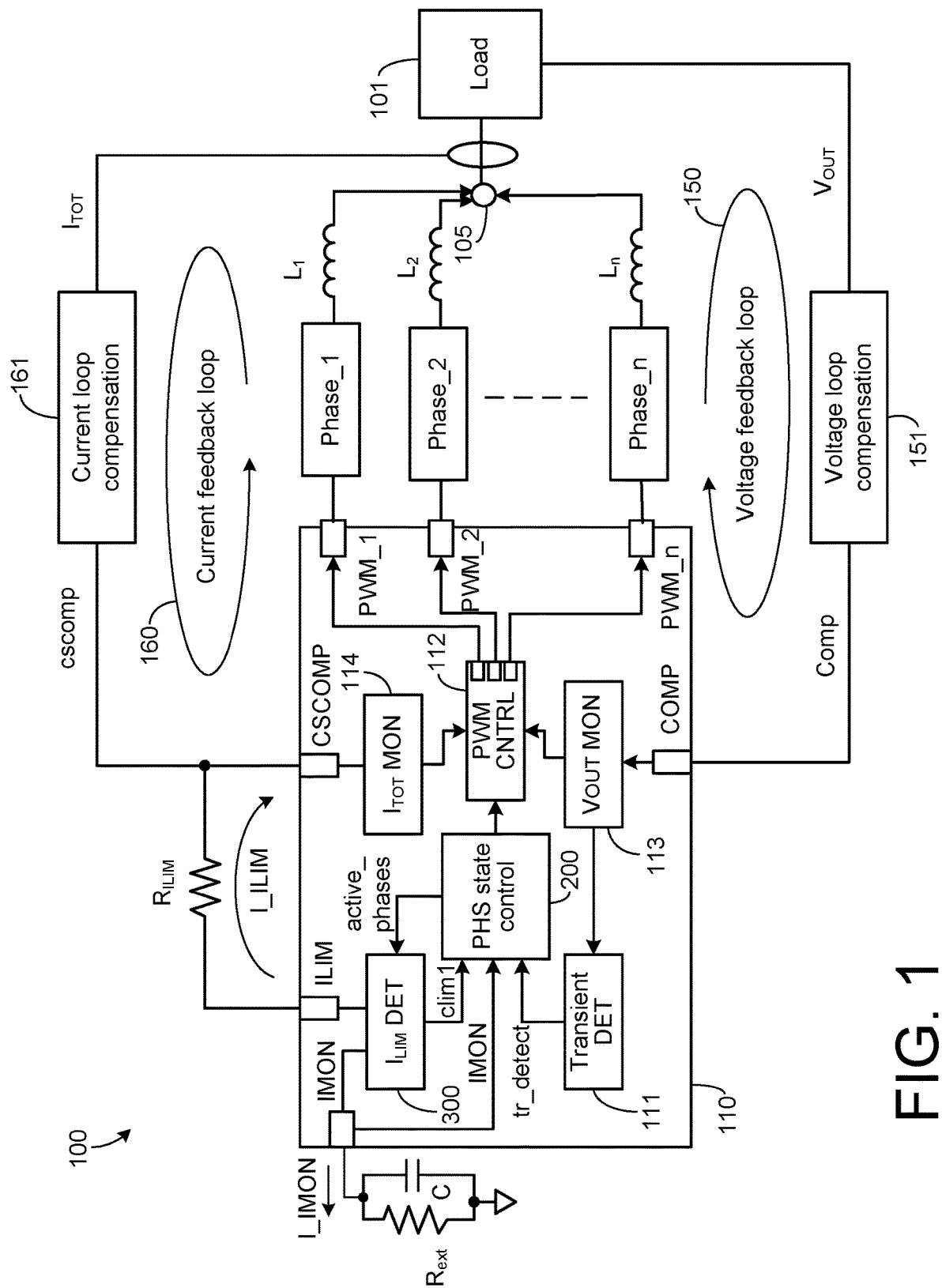
FIG. 1 is a block diagram of a power system according to a possible implementation of the present disclosure.

FIG. 1 is a block diagram of a power system according to a possible implementation of the present disclosure. The power system 100 includes a load 101 that receives power from a rail 105. The power requirements of the load may change with time. For example, in a high-load condition (i.e., heavy-load condition), the current drawn from the rail 105 by the load 101 may be higher than the current drawn from the rail 105 by the load 101 in a low-load condition (i.e., light-load condition). The load may change from a low-load condition to a high-load condition very quickly (e.g., 50 microseconds), and the load may change conditions without signaling the power circuitry feeding (i.e., supplying) the rail 105. For example, the load may be a processor, which may draw different current levels as the amount of processing performed changes over time.

The power circuitry feeding the rail may include a plurality of phases. As shown, the power system 100 may include a number (n) of phases (i.e., PHASE_1, PHASE_2, PHASE_n). In a possible implementation, n=4 so that the power system includes four phases. Each phase may output the same (regulated) output voltage at the rail 105 (i.e., $V_{OUT}$) based on a pulse width modulation (PWM) signal supplied to each phase from a controller 110. In other words, the controller 110 may be configured to supply each phase with a unique PWM signal, which can enable the power generation to be distributed between the phases and changed when necessary. As shown, each phase (PHASE_1, PHASE_2, PHASE_n) is coupled to a respective PWM pin (PWM_1, PWM_2, PWM_3) of the controller 110 to receive its PWM signal (e.g., unique PWM signal). Each phase can output a phase current, which are summed at the rail 105 to provide the load with a total current ($I_{TOT}$). An active phase is a phase that outputs a phase current that is greater than zero, while an inactive phase is a phase that outputs a phase current that is approximately zero.

When the current drawn from the rail 105 is low, then it can be supplied from a reduced number of phases (i.e., number of required phases<n). For example, one phase may be sufficient to supply all the current necessary for the load in a low-load condition. Deactivating the other phases (i.e., phase shedding) can reduce an overall power consumed by the phases because inactive phases do not need to be switched. Accordingly, it may be desirable to shed (i.e., deactivate) phases and add (i.e., activate) phases according to a load condition.

In a possible implementation, the controller 110 is configured to receive a sensed load condition, and in response, adjust which phases are active and inactive using the PWM signals sent to the phases. Accordingly, the power system may include sensors to sense the total current (i.e., $I_{TOT}$) drawn by the load 101 (i.e., at the rail 105) and the output voltage (i.e., $V_{OUT}$) on the load 101 (i.e., at the rail 105) in order to detect load changes. For example, changes to the voltage/current on the load 101 may be fed back to a controller 110, which can adjust the PWM signals fed to the phases to compensate for the changes and regulate the voltage at a relatively fixed level. Additionally, the controller 110 can activate/deactivate (i.e., add/remove) phases as necessary for a sensed voltage/current based on current/ efficiency rules (i.e., thresholds) for the power system 100.

The phases (PHASE_1, PHASE_2, PHASE_n) may each be part of a power converter of the same type. For example, each phase may be part of a synchronous buck converter (i.e., converter) configured to transform a supplied voltage (not shown) down to the output voltage ($V_{OUT}$) supplied to the rail 105 based on a PWM signal. A phase for a synchronous buck converter can be implemented as an integrated driver plus switches (i.e., DRMOS) that includes an inductor ($L_1$, $L_2$, $L_n$) coupled to its output. The inductor can be charged/discharged during each period (i.e., cycle) of the PWM signal. The duty cycle of the PWM signal may be reduced when very low currents are drawn from the output. When the duty cycle becomes very low, the inductor ($L_1$, $L_2$, $L_n$) can be fully discharged during a cycle of the PWM signal, and the converter is said to operate in a discontinuous current mode (DCM). Otherwise, the inductor ($L_1$, $L_2$, $L_n$) is not fully discharged during a cycle of the PWM signal, and the converter is said to operate in a continuous current mode (CCM). Accordingly, when one phase is active to supply a load, it may be controlled in a DCM or a CCM by the PWM signals, which correspond to the load condition determined by the controller 110 based on the feedback signals.

The power system 100 can include a current feedback loop 160 configured to output a current feedback signal (i.e., cscomp), which corresponds to the total current ($I_{TOT}$), to the controller 110. The current feedback loop 160 can include a current loop compensation circuit 161 that is configured to generate the current feedback signal (cscomp) from the total load current ($I_{TOT}$). For example, the current loop compensation circuit 161 may include a droop comparator configured to generate the current feedback signal (cscomp) as a voltage which corresponds to the total current (liar). The current loop compensation circuit 161 may be coupled between a current sensor at the rail 105 and a current sense pin (CSCOMP) of the controller 110 so that the voltage corresponding to the total current appears at the current sense pin (CSCOMP) of the controller 110.

The controller 110 may include a total current monitoring circuit 114 that can condition (e.g., amplify, filter, level shift, etc.) the current feedback signal (cscomp) for a PWM controller 112. The PWM controller 112 is configured to generate PWM signals based on a load condition which can depend, in part, on the total current ($I_{TOT}$).

The current sense pin (CSCOMP) of the controller 110 is coupled to a current limit pin (ILIM) of the controller 110 via a current limit resistor ($R_{ILIM}$) so that a current signal (i.e., I_ILIM) corresponding to the current feedback loop flows from the current limit pin (ILIM) to the current sense compensation pin (CSCOMP). The current limit resistor ($R_{ILIM}$) is configured to scale this current signal according to a current limit of the power system 100. Accordingly, a current limit of the power system 100 can be set based on a resistance of the current limit resistor ($R_{ILIM}$).

The power system 100 can further include a voltage feedback loop 150 configured to output a voltage feedback signal (i.e., comp), which corresponds to the output voltage ($V_{OUT}$), to the controller 110. The voltage feedback loop 150 can include a voltage loop compensation circuit 151 that is configured to generate the voltage feedback signal (comp) from the output voltage ($V_{OUT}$). For example, the voltage loop compensation circuit 151 may include type-3 compensation to provide a phase margin for the loop so that it operates stably. The response of the voltage feedback signal (comp) can depend on the tuning of the voltage loop compensation circuit 151. Accordingly, the response time of the voltage feedback signal to a load transient may vary based on the tuning of the voltage loop compensation.

One technical problem with using a voltage signal from a voltage feedback loop exclusively to trigger phase activation is that the controller cannot assume any particular response time for the voltage feedback loop because its tuning is external to the controller (e.g., set by a user). For example, over-damped tuning of the voltage loop compensation circuit may slow the activation of all phases in response to a load transient. As a result, damage to a phase or a shutdown (i.e., OCP) can occur. The disclosed controller 110 for a power system solves this technical problem by adding a second condition for all-phase activation (i.e., multiple trigger phase activation). The second condition is based on a current signal corresponding to the current feedback loop. The use of multiple conditions for transient detection can make the detection more accurate over a wider range of transient slew rates and makes the controller less reliant on the external tuning of the voltage loop compensation. For example, the current feedback loop may have a first response time to a load transient and the voltage feedback loop may have a second (different) response time to the load transient. The response times can be different so having a trigger based on each can ensure that both slower and faster transient conditions trigger the activation of all phases. Further, the multi-trigger all-phase activation of the disclosed controller may be superior to a phase control that relies exclusively on sampling inductor currents because the sampling may include an analog-to-digital converter (ADC) delay, which can slow the activation of all phases in response to a transient.

Returning to FIG. 2, the controller 110 may further include an output voltage monitoring circuit 113 that can condition (e.g., amplify, filter, level shift, etc.) the voltage feedback signal (comp) for the PWM controller 112 which can adjust PWM signals based on a load condition which can depend, in part, on the output voltage ($V_{OUT}$). For example, the controller 110 may adjust a duty cycle of the PWM signals based on a load condition, which can be determined from feedback signals (i.e., cscomp, comp) from the load 101.

The PWM controller 112 may also control which phases are active based on an active state determined by a phase state control module 200. The phase state control module 200 is configured to select an active state from a plurality of states based on a level of a monitored current (i.e., $I_{MON}$), which corresponds to the total current ($I_{TOT}$). The phase state control module may be considered as a state machine that includes a plurality of states related to the method for phase shedding used for the power system.

Figure 2:
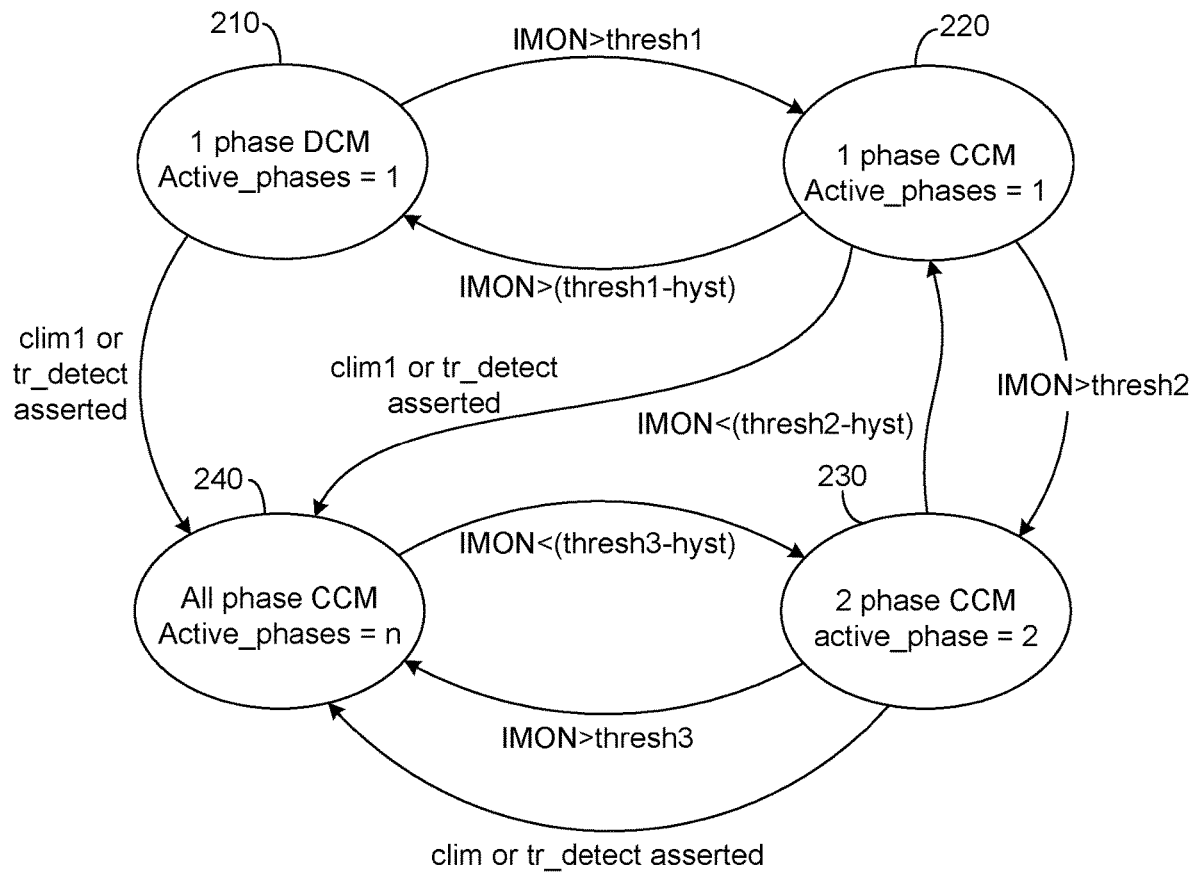
FIG. 2 is a state diagram illustrating the plurality states of the power system.

FIG. 2 is a state diagram illustrating the plurality of states of the power system. The state diagram helps illustrate the operation of the phase state control module 200. As shown in the state diagram, the disclosed power system can operate in one of four possible states regardless of the number of phases for the rail. The states are defined, in part, by how many phases are active, which in a non-transient condition, is determined by a level of a monitored current signal (IMON) at a monitored current pin (IMON) of the controller.

The monitored current signal (i.e., monitored current) ultimately corresponds to the total current ($I_{TOT}$) of the power system. In a possible implementation, a current signal (I_MON) at the current monitor pin (IMON) is generated as a mirrored version of the current signal (I_ILIM) at the current limit pin (ILIM). For example, the monitored current signal (IMON) can be a voltage generated by a parallel resistor ($R_{EXT}$) and capacitor (C) in response to the current signal (I_IMON).

The phase state control module 200 may be configured to compare the monitored current (IMON) to a plurality of thresholds to determine a level of the monitored current. As shown in FIG. 2, three thresholds of increasing levels may be used to select the active state of the power system. For example, a first threshold (i.e., thresh1) having a first level (e.g., 5 Amps) may be less than a second threshold (i.e., thresh2) having a second level (e.g., 15 Amps), which may be less than a third threshold (i.e., thresh3) having a third level (e.g., 25 Amps). Additionally, some transitions between states may include an additional hysteresis (i.e., hyst) having a level (e.g., 1 Amp (A)) to prevent chatter between levels.

The plurality of phases includes a first state 210. The first state 210 is a one-phase state in which one phase of the plurality of phases is active and is controlled in discontinuous-conduction mode (DCM). The first state 210 may be active when the monitored current is in a very low range (e.g., 0 A<IMON<5 A). In the first state 210, the phase state control module 200 may configure the PWM controller 112 to transmit a PWM signal to one phase (e.g., PHASE_1) to control it according to DCM.

The plurality of phases includes a second state 220. The second state 220 is a one-phase state in which one phase of the plurality of phases is active and is controlled in continuous-conduction mode (CCM). The second state 220 may be active when the monitored current is in a low range (e.g., 5 A≤IMON<15 A). In the second state 220, the phase state control module 200 may configure the PWM controller 112 to transmit a PWM signal to one phase (e.g., PHASE_1) to control it according to CCM.

The plurality of phases includes a third state 230. The third state 230 is a two-phase state in which two phases of the plurality of phases are active and are controlled in continuous-conduction mode (CCM). The third state 230 may be active when the monitored current is in a medium range (e.g., 15 A≤IMON<25 A). In the third state 230, the phase state control module 200 may configure the PWM controller 112 to transmit PWM signals to two phases (e.g., PHASE_1, PHASE_2) to control them according to CCM.

The plurality of phases includes a fourth state 240. The fourth state 240 is an all-phase state in which all phases of the plurality of phases are active and are controlled (by PWM signals) in continuous-conduction mode (CCM). The fourth state 240 may be active when the monitored current is in a high range (e.g., 25 A≤IMON). In the fourth state 240, the phase state control module 200 may configure the PWM controller 112 to transmit PWM signals to all phases (e.g., PHASE_1, PHASE 2, . . . , PHASE_n) to control them according to CCM.

The active state may move between the first state 210, the second state 220, the third state 230, and the fourth state 240 according to the monitored current until a transient condition occurs. A transient condition may be a fast (e.g., ≤50 microseconds) change in a load that to a heavy-load condition. This heavy-load condition may correspond to a decrease in the output voltage ($V_{OUT}$) and/or an increase in the total current ($I_{TOT}$) that is step-like in time. When a transient is detected, the active state may move quickly from the existing active state (e.g., the first state 210, the second state 220, or the third state 230) to the fourth state 240, in which all phases are active.

The controller 110 uses multiple trigger signals (clim1, tr_detect) to ensure that this transition to the all-phase state happens quickly enough after a transient so that no damage occurs and to prevent an over-current protection (OCP) shutdown. The multiple trigger signals (clim1, tr_detect) may be binary signals. The binary signals can assert a condition by their level. For example, a trigger signal that is LOW (e.g., ground) when no transient condition exists may be asserted (i.e., generated) HIGH (e.g., 5 volts) when a transient condition occurs. Further, this trigger signal may remain asserted (e.g., HIGH) while the transient condition exists.

The multiple trigger signals include a current-limit detection signal (clim1) corresponding to the current feedback loop 160 and a transient detection signal (tr_detect) corresponding to the voltage feedback loop 150. As shown, in FIG. 2, the fourth state 240 is the active state while the current-limit detection signal (clim1) is asserted (i.e., is HIGH) and/or while the transient detection signal (tr_detect) is asserted (e.g., is HIGH) (e.g., regardless of the level of the monitored current (IMON)). The phase state control module may resume selecting the active state based on the level of the monitored current (IMON) when neither the current-limit detection signal (clim1) nor the transient-detection signal (tr_detect) is asserted.

Returning to FIG. 1, the controller 110 can include a transient detection circuit 111 that is configured to assert the transient-detection signal while a voltage signal from the voltage feedback loop 150 satisfies a voltage-transient condition. The transient detection circuit 111 can receive a signal from a voltage feedback loop. For example, the transient detection circuit 111 may receive a processed version of the voltage feedback signal (comp). The transient detection circuit 111 may be configured to (i) determine if this signal satisfies a voltage-transient condition by comparing the processed version of the voltage feedback signal (comp) to a threshold and (ii) output a transient detection signal (tr_detect) based on the comparison. For example, the transient detection signal may be at a first level (e.g., logical LOW) when (e.g., while) the signal is below the threshold and a second level (e.g., logical HIGH) when (e.g., while) the signal is above the threshold.

A voltage-transient condition may be asserted by a transient detection signal (tr_detect) based on its level. The phase state control module 200 may monitor the level of the transient detection signal (tr_detect) and adjust the active state of the power system 100 whenever (e.g., while) the transient detection signal is asserted. For example, the phase state control module 200 may activate all phases (i.e., fourth state 240) while the transient detection signal (tr_detect) is at a logical HIGH level.

The controller 110 may further include a current limit detection circuit 300 that is configured to assert a current-limit-detection (clim1) signal while a current signal (I_CLIM) corresponding to the current feedback loop 160 satisfies a current-transient condition that is based on a number of active phases in the active state of the power system (i.e., active_phases). For example, in the first state 210 the number of active phases is one (i.e., active_phases=1), in the second state 220 the number of active phases is one (i.e., active_phases=1), in the third state 230 the number of active phases is two (i.e., active_phases=2), and in the fourth state 240 the number of active phases is the total number of phases (i.e., active_phases=n).

In a possible implementation, the current limit detection circuit 300 may include a threshold that is proportional to the number of active phases in the active state. For example, a lower threshold may be used to activate all phases when the power system 100 is in a one-phase state than when the power system 100 is in a two-phase state. In another possible implementation the current limit detection circuit 300 further includes a delay. If the current-limit-detection signal is asserted for a period longer than the delay, then an (clim1) OCP condition may be triggered, and the rail (i.e., all phases) may be shut down in response (i.e., over current protection shutdown). This delay can help prevent OCP conditions from being detected based on short-lived transients (e.g., current in-rush, etc.).

The current limit detection circuit 300 can receive a current signal (e.g., I_ILIM) from a current feedback loop 160. The transient detection circuit 111 may be configured to (i) determine if a current-transient condition exists by comparing a version of the current signal to a threshold and (ii) output a current-limit-detection signal (clim1) based on the comparison. For example, the current-limit-detection signal may be at a first level (e.g., logical LOW) when (e.g., while) the signal is below the threshold (Clim1_thresh) and a second level (e.g., logical HIGH) when (e.g., while) the signal is above the threshold.

Figure 3:
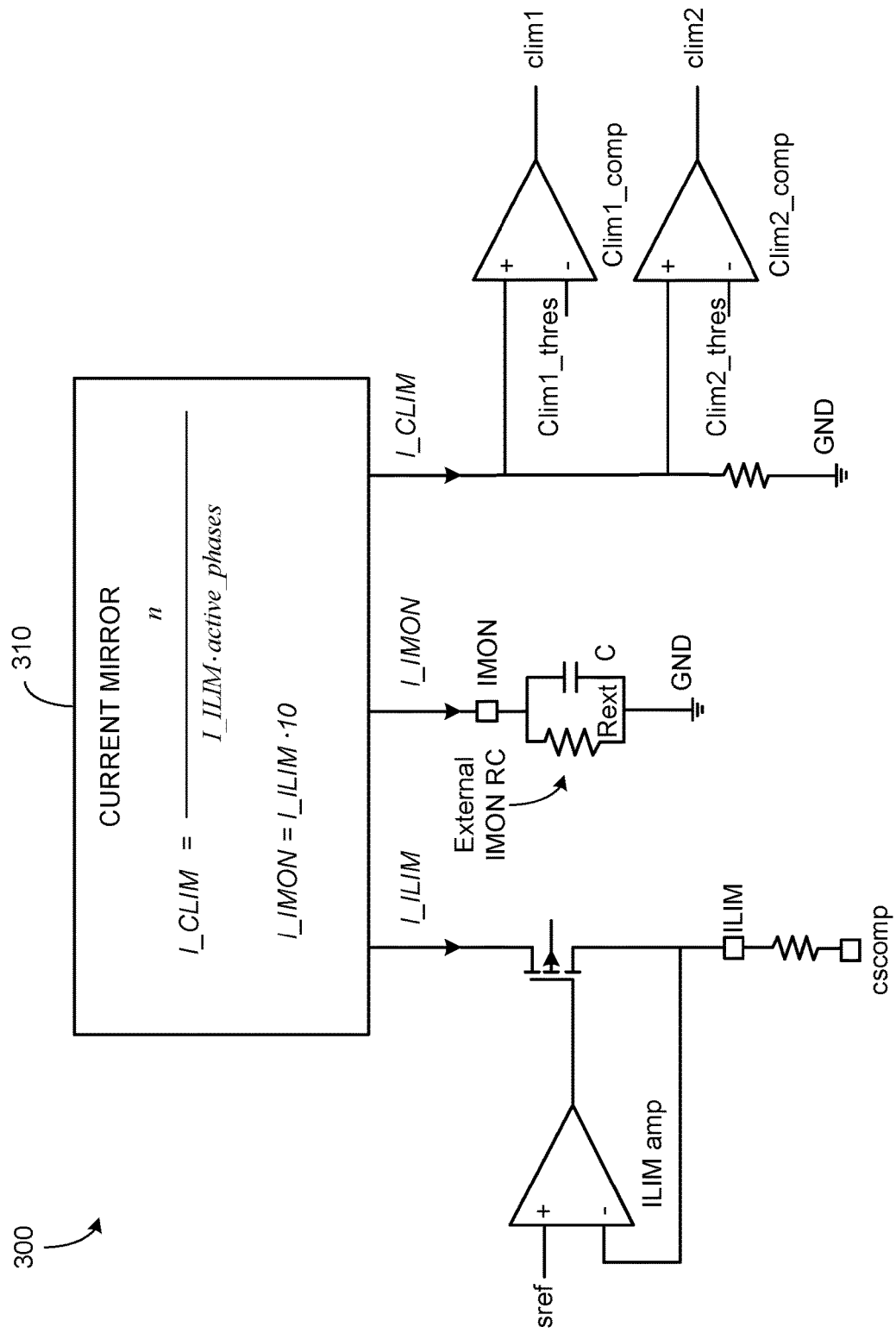
FIG. 3 is a block diagram of a current limit detection circuit of the controller for a power system according to a possible implementation of the present disclosure.

FIG. 3 is a block diagram of a current limit detection circuit of the controller for a power system according to a possible implementation of the present disclosure. The current limit detection circuit includes a current mirror 310 that is configured to mirror the current (limit) signal (I_ILIM) corresponding to the current feedback loop 160, which flows from the current limit pin (ILIM) to the current sense compensation pin (CSCOMP).

The current mirror 310 is configured to generate a (monitored) current signal (I_IMON) at the current monitor pin (IMON). The (monitored) current signal (I_IMON) is a multiple of the current (limit) signal (I_ILIM) and flows through the external RC circuit that includes the resistor ($R_{EXT}$) and the capacitor (C) coupled to the current monitor pin (IMON). The (monitored) current signal can be given by the equation below.

$$I\_IMON = I\_ILIM \cdot 10 \tag{1}$$

The current mirror 310 is further configured to generate a current signal (I_CLIM) which is based on the current limit signal (I_ILIM), a total number of phases coupled to the rail (i.e., n) and a number of the phases that are active (i.e., active_phases), which can change based on the active state, as discussed. The current signal (I_CLIM) can be given by the equation below.

$$I\_CLIM = \frac{n}{I\_ILIM \cdot active\_phases} \tag{2}$$

The current signal (I_CLIM) is compared to a first threshold (Clim1_thres) using a comparator. The output of the comparator is the current-limit-detection signal (clim1). Accordingly, the current-transient condition may change according to the active phases but instead of changing the threshold, the current, which is compared to the threshold, can be changed.

The current signal (I_CLIM) may also be compared to a second threshold (Clim2_thres) using a second comparator. The output of the second comparator is an OCP signal (clim2) which can be asserted for over current protection. While the clim1 OCP condition may be delayed, the clim2 OCP condition may not include a delay. In a possible implementation, the second threshold (Clim2_thres) may be a multiple (e.g., 1.5 times) the first threshold (Clim1_thres)

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A power system comprising:
  a plurality of phases configured by a plurality of pulse width modulation (PWM) signals to output a total current at a regulated voltage to a load; and
  a controller configured to output the plurality of PWM signals to the plurality of phases, the controller including:
    a phase state control module configured determine a level of a monitored current corresponding to the total current and to select an active state from a plurality of states based on the level of the monitored current;
    a current limit detection circuit configured to assert a current-limit-detection signal while a current signal corresponding to a current feedback loop satisfies a current-transient condition that is based on a number of active phases in the active state of the power system; and
    a transient detection circuit configured to assert a transient-detection signal while a voltage signal from a voltage feedback loop satisfies a voltage-transient condition, wherein the phase state control module is further configured to change the active state of the power system to an all-phase state while either the current-limit-detection signal or the transient-detection signal is asserted.

2. The power system according to claim 1, wherein the phase state control module is further configured to resume selecting the active state based on the level of the monitored current when neither the current-limit-detection signal nor the transient-detection signal is asserted.

3. The power system according to claim 1, wherein:
  the current limit detection circuit includes a threshold that is proportional to the number of active phases in the active state; and
  the current limit detection circuit is configured to assert the current-limit-detection signal while the current signal from the current feedback loop exceeds the threshold.

4. The power system according to claim 3, wherein the current limit detection circuit further includes:
  a delay so that an over current protection shutdown of the active phases can be triggered if the current-limit-detection signal is asserted for a period longer than the delay.

5. The power system according to claim 1, further including:
  a PWM controller configured to transmit at least one PWM signal to the plurality of phases based on the active state selected by the phase state control module.

6. The power system according to claim 5, wherein the plurality of states includes:
  a one-phase state in which one phase of a plurality of phases is active and is controlled in a discontinuous-conduction mode (DCM) by the at least one PWM signal;
  a one-phase state in which one of the plurality of phases is active and is controlled in a continuous-conduction mode (CCM) by the at least one PWM signal;
  a two-phase state in which two phases of the plurality of phases is active and are controlled in a continuous-conduction mode by the at least one PWM signal; and
  the all-phase state in which all phases of the plurality of phases are active and are controlled in a continuous-condition mode by the at least one PWM signal.

7. The power system according to claim 1, wherein the current limit detection circuit includes a current mirror configured to mirror the current signal from the current feedback loop in proportion to a number of active phases in the active state.

8. The power system according to claim 1, wherein:
  each phase of the plurality of phases is a synchronous buck converter.

9. The power system according to claim 1, wherein the load is a processor.

10. The power system according to claim 1, wherein the current feedback loop has a first response time to a load transient, and the voltage feedback loop has a second response time to the load transient, the first response time different from the second response time.

11. A method for controlling a power system, the method comprising:
  generating a monitored current corresponding to a total current delivered to a load of the power system;
  comparing the monitored current to a plurality of thresholds to determine a level of the monitored current;
  selecting an active state of the power system from a plurality of states based on the level of the monitored current;
  asserting a current-limit-detection signal while a current signal corresponding to a current feedback loop of the power system satisfies a current-transient condition that is based on a number of active phases in the active state of the power system;
  asserting a transient detection signal while a voltage signal from a voltage feedback look of the power system satisfies a voltage-transient condition; and
  changing the active state of the power system to an all-phase state while either the current-limit-detection signal or the transient detection signal is asserted.

12. The method for controlling the power system according to claim 11, further comprising:
resuming the selection of the active state based on the level of the monitored current when neither the current-limit-detection signal nor the transient detection signal is asserted.

13. The method for controlling the power system according to claim 11, wherein:
the current-transient condition includes a threshold that is proportional to the number of active phases in the active state of the power system; and
the current-limit-detection signal asserted while the current signal from the current feedback loop exceeds the threshold.

14. The method for controlling the power system according to claim 11, further including:
triggering an over current protection shutdown of the active phases if the current-limit-detection signal is asserted for a period longer than a delay.

15. The method for controlling the power system according to claim 11, further including:
transmitting at least one pulse width modulation (PWM) signal to the plurality of phases based on the active state selected.

16. The method for controlling the power system according to claim 15, wherein the plurality of states includes:
a one-phase state in which one phase of a plurality of phases is active and is controlled in a discontinuous-conduction mode (DCM) by the at least one PWM signal;
a one-phase state in which one of the plurality of phases is active and is controlled in a continuous-conduction mode (CCM by the at least one PWM signal;
a two-phase state in which two phases of the plurality of phases is active and are controlled in a continuous-conduction mode by the at least one PWM signal; and
the all-phase state in which all phases of the plurality of phases are active and are controlled in a continuous-condition mode by the at least one PWM signal.

17. The method for controlling the power system according to claim 11, further including:
mirroring the current signal from the current feedback loop according to a number of phases active in the active state.

18. A controller for a power system, comprising:
a phase state control module configured determine a level of a monitored current corresponding to a total current output to a load and to select an active state from a plurality of states based on the level of a monitored current;
a current limit detection circuit configured to assert a current-limit-detection signal while a current signal corresponding to a current feedback loop coupled to the controller satisfies a current-transient condition that is based on a number of active phases in the active state of the power system; and
a transient detection circuit configured to assert a transient-detection signal while a voltage signal corresponding to a voltage feedback loop coupled to the controller satisfies a voltage-transient condition, wherein the phase state control module is further configured to change the active state of the power system to an all-phase state while either the current-limit-detection signal or the transient-detection signal is asserted.

19. The controller for the power system according to claim 18, wherein the phase state control module is further configured to resume selecting the active state based on the level of the monitored current when neither the current-limit-detection signal nor the transient-detection signal is asserted.

20. The controller for the power system according to claim 18, wherein the current limit detection circuit includes a current mirror configured to mirror the current signal from the current feedback loop in proportion to a number of active phases in the active state.

\* \* \* \* \*